United States Patent
Wang et al.

(10) Patent No.: US 9,748,988 B2
(45) Date of Patent: Aug. 29, 2017

(54) INTERFERENCE WAVE SIGNAL REMOVING DEVICE, GNSS RECEPTION APPARATUS, MOBILE TERMINAL, INTERFERENCE WAVE SIGNAL REMOVING PROGRAM AND INTERFERENCE WAVE REMOVING METHOD

(75) Inventors: Dun Wang, Nishinomiya (JP); Hitoshi Kondo, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 816 days.

(21) Appl. No.: 14/118,205

(22) PCT Filed: Dec. 19, 2011

(86) PCT No.: PCT/JP2011/079296
§ 371 (c)(1),
(2), (4) Date: Nov. 15, 2013

(87) PCT Pub. No.: WO2012/157140
PCT Pub. Date: Nov. 22, 2012

(65) Prior Publication Data
US 2014/0070989 A1 Mar. 13, 2014

(30) Foreign Application Priority Data
May 16, 2011 (JP) .................. 2011-109264

(51) Int. Cl.
*H04B 1/10* (2006.01)
*G01S 19/21* (2010.01)
*H04B 1/7097* (2011.01)

(52) U.S. Cl.
CPC ............ *H04B 1/1036* (2013.01); *G01S 19/21* (2013.01); *H04B 1/7097* (2013.01)

(58) Field of Classification Search
CPC ...... H04B 1/1036; H04B 1/7097; G01S 19/21
See application file for complete search history.

(56) References Cited

U.S. PATENT DOCUMENTS 5,612,978 A * 3/1997 Blanchard ............ H04B 1/7102
348/607
6,219,376 B1 4/2001 Zhodzishsky et al.
(Continued)

FOREIGN PATENT DOCUMENTS

JP H03231542 A 10/1991
JP 2004328639 A 11/2004
(Continued)

OTHER PUBLICATIONS

Japanese Patent Office, International Search Report of PCT/JP2011/079296, Mar. 19, 2012, WIPO, 2 pages.

*Primary Examiner* — Cassie Galt
(74) *Attorney, Agent, or Firm* — Alleman Hall Creasman & Tuttle LLP

(57) ABSTRACT

An interference wave signal frequency is highly accurate and the interference wave signal is surely removed. A controller of an interference wave signal remover detects the interference wave signal based on a frequency scanning result by an entire-range frequency scanner, and sets a notch filter to attenuate the interference wave signal frequency. A local scan frequency band $BWf_L$ of a local frequency scanner is set by having the interference wave signal frequency as its central frequency, and local scan frequencies $BIN_L$ are set so that frequency bands overlap with each other between adjacent frequency $BIN_A$. The local frequency scanner frequency-scans input signals to the notch filter. The controller calculates a frequency error $\delta f$ of the interference wave signal frequency from the local frequency scanner, corrects the interference wave signal frequency which is from the entire-range frequency scanner by the frequency error $\delta f$, and updates the setting of the notch filter.

15 Claims, 7 Drawing Sheets

(56) References Cited

U.S. PATENT DOCUMENTS

| | | | | |
|---|---|---|---|---|
| 7,587,171 B2* | 9/2009 | Evans | ............... | H04B 7/18513 455/114.2 |
| 8,238,863 B2* | 8/2012 | Farmer | ............... | G01S 5/0215 455/226.3 |
| 2007/0286264 A1* | 12/2007 | Kontola | ............... | H04B 1/7101 375/152 |
| 2008/0240315 A1 | 10/2008 | De Mey et al. | | |

FOREIGN PATENT DOCUMENTS

| | | |
|---|---|---|
| JP | 2005260860 A | 9/2005 |
| JP | 2007535265 A | 11/2007 |

\* cited by examiner

INTERFERENCE WAVE SIGNAL REMOVING DEVICE, GNSS RECEPTION APPARATUS, MOBILE TERMINAL, INTERFERENCE WAVE SIGNAL REMOVING PROGRAM AND INTERFERENCE WAVE REMOVING METHOD

TECHNICAL FIELD

The present invention mainly relates to an interference wave signal removing device which removes an interference wave signal different from a signal and the like to be received, and a GNSS reception apparatus and a mobile terminal provided with the interference wave signal removing device.

BACKGROUND ART

GNSS (Global Navigation Satellite Systems) such as a GPS (Global Positioning System) are used for, for example, positioning by receiving GNSS signals broadcasted from positioning satellites. Each GNSS signal is comprised of a spread spectrum signal which is code modulated by a pseudo noise.

When receiving such a GNSS signal, if a signal other than the GNSS signal (hereinafter, referred to as the interference wave signal) is received, a disadvantage may be caused, for example, reception sensitivity to the GNSS signal degrades.

Therefore, Patent Document 1 and Patent Document 2 disclose interference wave signal removing devices for detecting and removing interference wave signals of which frequency bands are narrow (having narrow bands) different from GNSS signals. FIG. 1 is a block diagram of main circuits of the conventional interference wave signal removing device 100P disclosed in Patent Document 1.

The conventional interference wave signal removing device 100P disclosed in Patent Document 1 includes the controller 101P, the notch filter 102P, the frequency analyzer 103P, and the frequency scanner 104P. The controller 101P specifies a frequency of an interference wave signal based on a frequency spectrum of an input signal $S_i$ obtained from the frequency analyzer 103P and a frequency spectrum of an output signal $S_{op}$ obtained from the frequency scanner 104P. Further specifically, the specification of the interference wave signal frequency is performed by the following processing.

FIG. 2 is a view illustrating a concept of a plurality of frequency BIN set by the conventional frequency scanner 104P. As illustrated in FIG. 2, the frequency scanner 104P divides an entire scan frequency $BWf_A$ into a plurality (5,000 in FIG. 2) of frequency BIN each comprised of a frequency band $BWf_{ABIN}$, integrates signals per unit of the frequency BIN, and outputs the integrated signals of the respective frequency BIN to the controller 101P. The controller 101P detects the frequency BIN of the integrated signals comprised of signal levels above a predetermined threshold and sets the central frequency of the frequency BIN to the interference wave signal frequency.

The controller 101P adjusts the attenuation property of the notch filter 102P to attenuate the interference wave signal frequency based on the information of the specified interference wave signal frequency.

Since the interference wave signal frequency is specified by such processing, in the method of Patent Document 1, the frequency resolution for detecting the interference wave signal frequency is determined by the bandwidth of the frequency BIN. Therefore, if the bandwidth of the frequency BIN is wide, the interference wave signal frequency cannot be detected in high accuracy, and if the bandwidth of the frequency BIN is narrow, even though the interference wave signal frequency can be detected in high accuracy, the number of the frequency BIN increases and the detecting time length of the interference wave signal frequency increases. For example, when the bandwidth of the frequency BIN is set to 1/N, if the entire scan frequency band range is stable, the number of the frequency BIN to be scanned increases by N-times and the integrating time length for one frequency BIN increases by N-times. Therefore, the scanning period of time for the entire scan frequency band range increases by $N^2$-times.

Therefore, in Patent Document 2, the interference wave signal frequency is estimated by using a concept illustrated in FIG. 3. FIG. 3 is a view for describing a frequency estimation concept in Patent Document 2. In FIG. 3, FS[f(n)] indicates a sinc function of the of the frequency BIN of which the central frequency is f(n). FS[f(n+1)] indicates a sinc function on the higher frequency side by one frequency BIN from the frequency BIN of FS[f(n)], where the central frequency is f(n+1). FS[f(n−1)] indicates a sinc function on the lower frequency side by one frequency BIN from the frequency BIN of FS[f(n)], where the central frequency is f(n−1). Here, when the integrating time period is T, the frequency bandwidth BW of each frequency BIN is 1/T, and the central frequency f(n+1)=f(n)+1/T and the central frequency f(n−1)=f(n)−1/T.

In Patent Document 2, by using the setting of the frequency BIN illustrated in FIG. 2, the signal level $Z_{CW}(n)$ of the frequency BIN of FS[f(n)] where the interference wave signal is detected, and the signal level $Z_{CW}(n+1)$ of the frequency BIN of FS[f(n+1)] or the signal level $Z_{CW}(n-1)$ of the frequency BIN of FS[f(n-1)], an estimation of an interference wave signal frequency $f_{CW}$ is calculated based on Equation (1) if $Z_{CW}(n+1) > Z_{CW}(n-1)$ or based on Equation (2) if $Z_{CW}(n+1) < Z_{CW}(n-1)$.

$$f_{CW} = f(n) + \frac{1}{T} \frac{Z_{cw}(n+1)}{Z_{cw}(n) + Z_{cw}(n+1)} \quad (1)$$

$$f_{CW} = f(n) - \frac{1}{T} \frac{Z_{cw}(n-1)}{Z_{cw}(n) + Z_{cw}(n-1)} \quad (2)$$

REFERENCE DOCUMENTS OF CONVENTIONAL ART

Patent Documents

Patent Document 1: US 2008/0240315
Patent Document 2: U.S. Pat. No. 6,219,376

DISCLOSURE OF THE INVENTION

Problems to be Solved by the Invention

However, in the method of using Equations (1) and (2) described above, non-linear comparison processing is required to be performed, when a signal power-to-noise power ratio SNR, more accurately, a jammer power-to-noise power ratio JNR is reduced, a squaring loss caused by the non-linear processing increases. Therefore, in the method of using Equations (1) and (2) described above by comparison therebetween, an estimation error of the interference wave frequency becomes large.

Therefore, the present invention aims to provide an interference wave signal removing device for estimating an interference wave signal frequency promptly and highly accurately and performing an interference wave signal removal without being influenced by a reception environment.

SUMMARY OF THE INVENTION

This invention relates to an interference wave signal removing device for removing an interference wave signal different from a desired signal that is contained in reception signals. This interference wave signal removing device includes a notch filter adjustable of an attenuation frequency band, a frequency scanner, and a controller. The frequency scanner outputs integrated signals of the reception signals at respective frequency bins which having a predetermined frequency width and partially overlapping with each other in a scan frequency band. The controller calculates an estimation of error of the interference wave signal frequency based on the intensities of the integrated signals of the respective frequency bins, corrects the detected interference wave signal frequency by the error, and sets the attenuation frequency band of the notch filter.

Moreover, the controller of the interference wave signal removing device of this invention may set the interference wave signal frequency to be a central frequency of the frequency bin where the intensity of the integrated signal of each frequency bin is higher than a predetermined threshold, and the controller may calculate the error of the interference wave signal frequency based on the intensities of the integrated signals of frequency bins adjacent to the frequency bin of the interference wave signal frequency on a frequency axis.

Moreover, the controller of the interference wave signal removing device of this invention may correct the interference wave signal frequency by integrating the error to the interference wave signal frequency.

With this configuration, the error of the interference wave signal frequency is directly calculated based on the intensities of the integrated signals of the plurality of frequency bins adjacent to the frequency bin where the interference wave signal is detected. Therefore, the interference wave frequency can be corrected without performing the non-linear comparison as the conventional art, and the interference wave frequency can be detected highly accurately. Thus, the attenuation frequency band of the notch filter can be set highly accurately.

Further, with the interference wave signal removing device of this invention, the frequency scanner may include a first frequency scanner and a second frequency scanner. The first frequency scanner may frequency-scan the output signals that are the reception signals outputted through the notch filter in a first frequency band, and output first integrated signals of respective frequency bins that have frequency bands non-overlapped with each other and are each formed of a first frequency bandwidth. The second frequency scanner may frequency-scan the reception signals in a second frequency band comprised of a frequency band narrower than the first frequency band and based on the attenuation frequency band, and output second integrated signals at respective frequency bins having frequency bands that partially overlap with each other and are each formed of a second frequency bandwidth. The controller may detect the interference wave signal frequency based on the first integrated signals and calculates the estimation of error of the interference wave signal based on the second integrated signals.

With this configuration, the detection of the interference wave frequency over the entire range of the frequency band to be scanned is performed by the first frequency scanner. Then, the local frequency band is set for the detected interference wave frequency, and it is scanned by the second frequency scanner and utilized for the error detection. Thus, since a frequency BIN with a narrow frequency bandwidth is used only for the error detection, a rapid detection of the interference wave signal frequency and a highly accurate detection (correction) can be realized.

Moreover, with the interference wave signal removing device of this invention, the frequency width of the second frequency band may be set narrower than the frequency width of the first frequency band. With this configuration, the width of the frequency BIN used for calculating the error frequency becomes narrow, and the error frequency can be detected in higher accuracy.

Moreover, with the interference wave signal removing device of this invention, the notch filter may include a plurality of notch filters and are connected in series. The second frequency scanner may be provided for each of the plurality of notch filters. Each of the second frequency scanners set for each notch filter may scan the input signals of the notch filter as a setting target in the second frequency band set to each second frequency scanner, and each second frequency scanner may output the respective second integrated signals of the respective frequency bins that are each formed of the second frequency bandwidth. Based on the second integrated signals outputted from each second frequency scanner, the controller may calculate the estimation of error of the interference wave signal frequency individually and sets the attenuation frequency band to each notch filter.

With this configuration, even when a plurality of interference wave signals exist, the detection and the correction of the frequency are performed on each of the interference wave signals. Therefore, even if a plurality of interference wave signals exist, the attenuation frequency band can be set highly accurately to each of the plurality of notch filters.

Moreover, with the interference wave signal removing device of this invention, the controller may perform low-pass filtering on the error. With this configuration, the measurement noise of the calculated estimation of frequency error can be suppressed, and the interference wave frequency can be corrected highly accurately.

Moreover, with the interference wave signal removing device of this invention, the notch filter may include a down-converter for multiplying the input signal by an attenuation pole setting signal for setting the attenuation frequency band outputted from the controller, a baseband signal generator for generating a baseband signal by extracting a baseband component of the down-converted signal, a subtracting element for subtracting the baseband signal from the down-converted signal, and an up-converter for multiplying the subtracted signal by the attenuation pole setting signal. The notch filter may output the baseband signal to the controller. The controller may detect removal of the interference wave signal based on the baseband signal and, when the successful removal of the interference wave signal is detected, release the setting of the attenuation frequency band to the notch filter.

With this configuration, a specific configuration of the notch filter is shown. Moreover, with this configuration, the baseband component of the down-converted signal obtained by multiplying the input signal by the attenuation pole setting signal corresponds to the frequency component of the interference wave. Therefore, by outputting the baseband signal to the controller, the controller can accurately detect the continuation and the removal of the interference wave signal. That is, highly accurate setting of the interference wave signal frequency described above becomes available, and the removal of the interference wave signal can be detected promptly.

Further, with this configuration, a circuit configuration only for extracting the frequency component of the interference wave signal from the input signals is not required. Therefore, an interference wave signal removing device can be realized with a simpler configuration. Moreover, this configuration is further effective also in a case where a plurality of stages of notch filters exist and the continuation and the removal of a plurality of interference wave signals are checked individually.

Furthermore, this invention relates to a GNSS reception apparatus for receiving and demodulating GNSS signals. The GNSS reception apparatus includes the interference wave signal removing device described above, a receiver, an acquirer/tracker, and a positioning operator. The receiver is connected before the interference wave signal removing device. The receiver receives GNSS signals as desired signals, generates GNSS reception signals, and outputs them to the interference wave signal removing device. The acquirer/tracker acquires and tracks the GNSS reception signals after the interference wave signal removal.

With this configuration, the attenuation frequency band of the notch filter is set highly accurately and the interference wave signal is surely removed as described above. Therefore, the speed and the accuracy of acquiring and tracking thereof improve. The positioning operator may perform positioning by using the tracked GNSS signals. Moreover, due to the improvement of the speed and the accuracy of the acquiring and the tracking, the converging speed of the positioning operation and the accuracy of the positioning result improve.

Furthermore, this invention relates to a mobile terminal. The mobile terminal includes the GNSS reception apparatus described above and an application processor for performing a predetermined application by using the positioning operation result of the positioning operator. With this configuration, the GNSS reception apparatus described above is provided, and the highly accurate positioning result can be utilized. Therefore, the performance of the application using the positioning result improves.

EFFECT OF THE INVENTION

According to this invention, an interference wave frequency can be detected highly accurately and the interference wave can surely be removed.

MODE FOR CARRYING OUT THE INVENTION

An interference wave signal removing device according to a first embodiment of the present invention is described with reference to the drawings. The interference wave signal removing device of this embodiment functions as an interference wave signal remover 50 of a GNSS reception apparatus 10.

Figure 1:
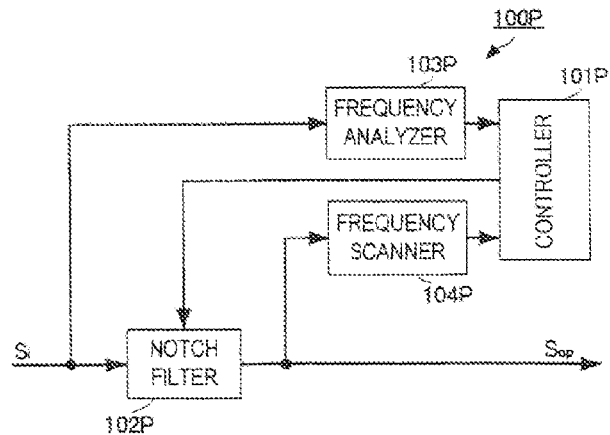
FIG. 1 is a block diagram of main circuits of the conventional interference wave signal removing device 100P disclosed in Patent Document 1.
Figure 2:
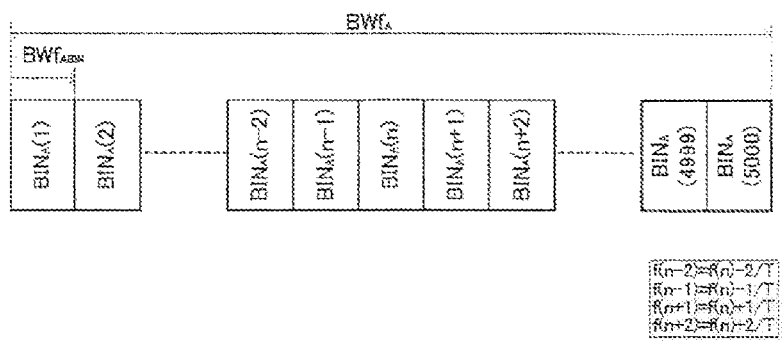
FIG. 2 is a view illustrating a concept of a plurality of frequency BIN set by the conventional frequency scanner 104P.
Figure 3:
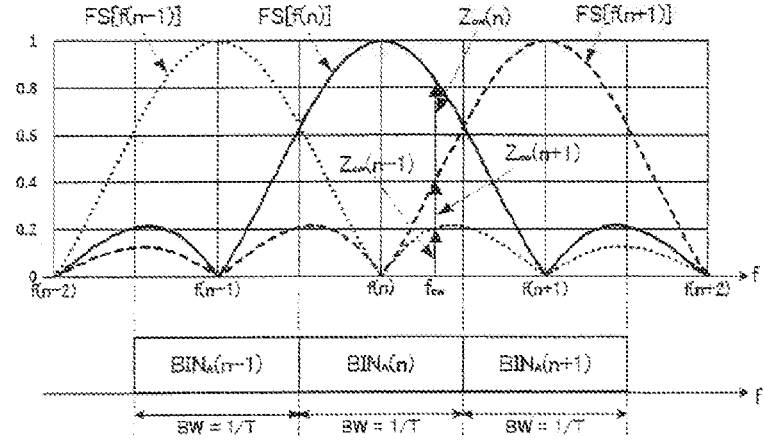
FIG. 3 is a view for describing a frequency estimation concept in Patent Document 2.
Figure 4:
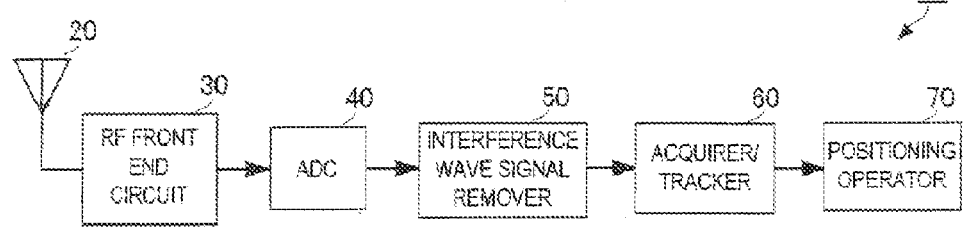
FIG. 4 is a block diagram of a GNSS reception apparatus 10 according to a first embodiment.

FIG. 4 is a block diagram of a GNSS reception apparatus 10 according to the first embodiment. The GNSS reception apparatus 10 includes a GNSS antenna 20, an RF front end circuit 30, an analog-to-digital converter (ADC) 40, the interference wave signal remover 50, an acquirer/tracker 60, and a positioning operator 70. The GNSS antenna 20 receives wireless signals including GNSS signals and outputs them to the RF front end circuit 30.

Each GNSS signal is a signal obtained by code-modulating a carrier wave signal with a pseudo noise, and is a spread spectrum signal in which frequency components spread in a wide band and each frequency component has a low spectral intensity. Moreover, for example, when it is an L1 wave signal of GPS signals, a navigation message is superimposed thereon.

Here, when an interference wave signal exists and a frequency of the interference wave signal is within a reception frequency band of the antenna, the reception signals contain the interference wave signal on top of the GNSS signal.

The RF front end circuit 30 converts the reception signal into an intermediate frequency signal (IF signal) and outputs it to the ADC 40. The ADC 40 samples the analog IF signal at a predetermined sampling interval to generate a digital IF signal and outputs it to the interference wave signal remover 50.

The interference wave signal remover 50 detects the frequency of the interference wave signal based on a scanning result for the entire-range of a scan frequency band. The interference wave signal remover 50 calculates a frequency error of the detected interference wave signal frequency within a local frequency range based on the detected interference wave signal frequency. The interference wave signal remover 50 corrects the detected interference wave frequency by the frequency error and sets an attenuation frequency band of the notch filter used for an interference wave removal based on the corrected interference wave signal frequency. The notch filter removes the interference wave signal from the IF signals and outputs the signals only containing the GNSS signals to the acquirer/tracker 60.

The acquirer/tracker 60 performs a correlation between each output signal from the interference wave signal remover 50, which is the GNSS signal, and a reference signal to acquire and track a carrier phase and a code phase, and outputs the tracking result (correlation result) to the positioning operator 70. The positioning operator 70 performs a positioning operation by calculating a pseudorange or the like based on the correlation result. Here, if the navigation message is superimposed on the GNSS signals, the navigation message is demodulated and used for the positioning operation.

By using the GNSS reception apparatus 10 with such a configuration, since the GNSS signals are inputted into the acquirer/tracker 60 in a state where the interference wave signal is removed therefrom, the acquisition and the tracking are facilitated and a highly accurate positioning operation result can be obtained.

Figure 5:
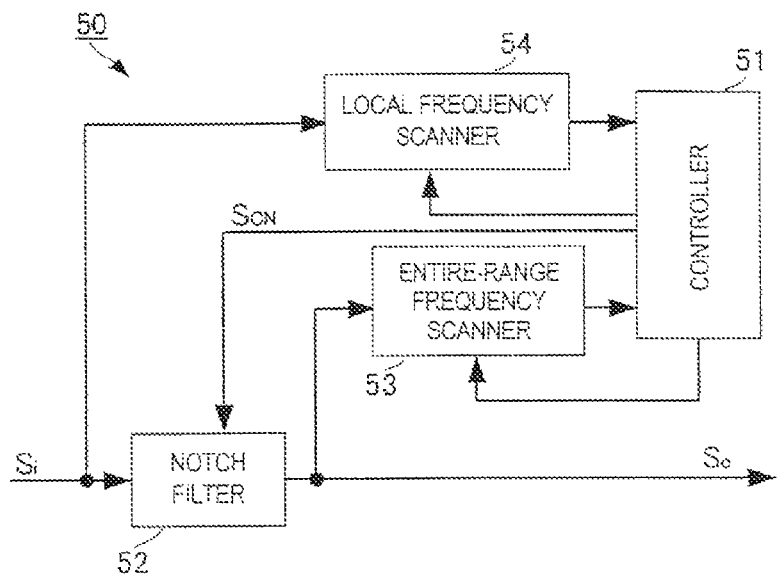
FIG. 5 is a block diagram of an interference wave signal remover 50 according to the first embodiment.
Figure 6:
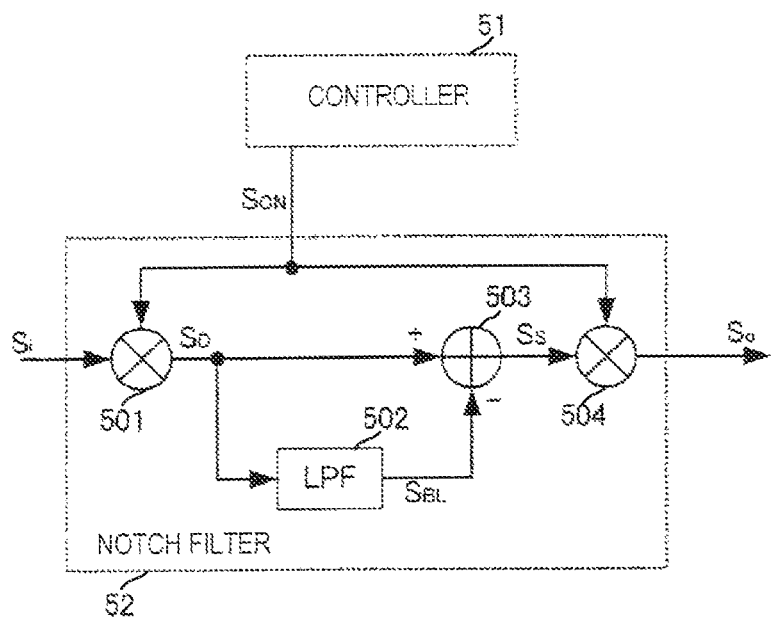
FIG. 6 is a circuit block diagram of a notch filter 52 according to the first embodiment.
Figure 7:
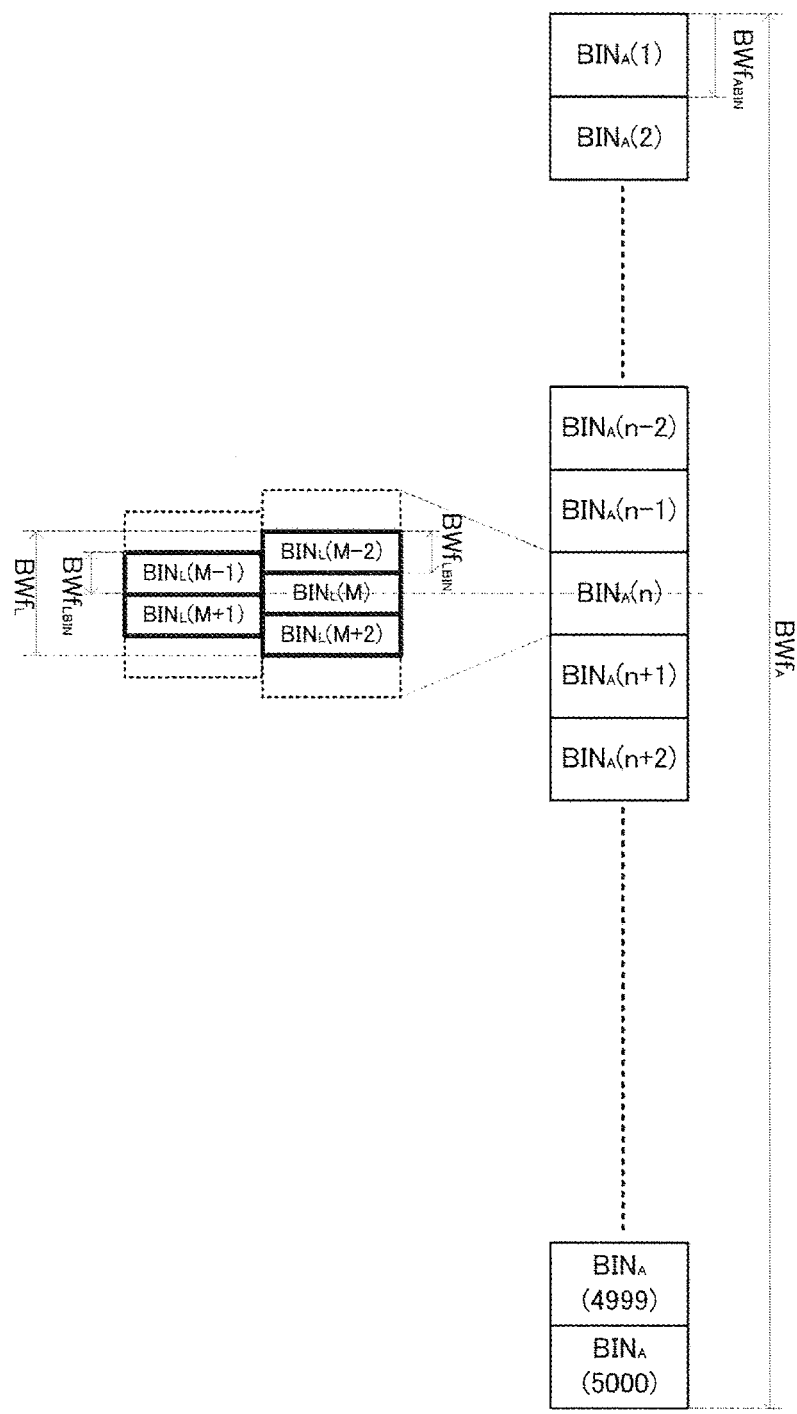
FIG. 7 is a view illustrating scan frequency bands of an entire-range frequency scanner 53 and a local frequency scanner 54 and a plurality of frequency BIN (frequency bins).

Next, the configuration and the processing of the interference wave signal remover 50 are described further in detail. In this embodiment, a case where a single-stage notch filter is provided to the interference wave signal remover 50 is described. FIG. 5 is a block diagram of the interference wave signal remover 50 according to the first embodiment. FIG. 6 is a circuit block diagram of a notch filter 52 according to the first embodiment. FIG. 7 is a view illustrating scan frequency bands of an entire-range frequency scanner 53 and a local frequency scanner 54 and frequency bins (a plurality of frequency BIN).

The interference wave signal remover 50 includes a controller 51, the notch filter 52, the entire-range frequency scanner 53 corresponding to the "first frequency scanner" of the present invention, and the local frequency scanner 54 corresponding to the "second frequency scanner" of the present invention.

The controller 51 sets a scan frequency band $BWf_A$ and bandwidths $BWf_{ABIN}$ of scan frequencies BIN for the entire-range frequency scanner 53. The scan frequency band is set to be, for example, a reception band of the GNSS antenna 20 described above or the scan frequency band $BWf_A$ (see FIG. 7) having a carrier frequency of the GNSS signal as its central frequency and that has a possibility of influencing the acquisition and the tracking of the GNSS signal when an interference wave signal exists.

For example, the scan frequency band $BWf_A$ is set with a frequency band of 5 MHz. Moreover, the width $BWf_{ABIN}$ of the scan frequency bin (scan frequency BIN) is set with a frequency band of 1 kHz. Further, each frequency BIN ($BIN_A$) is set so that the scan frequency bands do not overlap with each other. Thus, the scan frequency band $BWf_A$ is divided into 5,000 frequency BIN ($BIN_A(1)$ to $BIN_A(5000)$), a scanning period of time (integrating period of time) of the signals at each scan frequency BIN is 1 msec, and a total scanning period of time for the scan frequency band $BWf_A$ becomes 5 sec.

The entire-range frequency scanner 53 is inputted with output signal $S_O$ of the notch filter 52. Over the entire range of the scan frequency band $BWf_A$, the entire-range frequency scanner 53 integrates signal intensities of the output signals $S_O$ to calculate an integrated value (integrated signal) for each frequency BIN (each of $BIN_A(1)$ to $BIN_A(5000)$). The entire-range frequency scanner 53 outputs the integrated signals of the respective frequency BIN ($BIN_A(1)$ to $BIN_A(5000)$) to the controller 51. Here, the entire-range frequency scanner 53 may compare the levels (signal intensities) of the integrated signals of the respective frequency BIN ($BIN_A(1)$ to $BIN_A(5000)$) and outputs only a highest predetermined number (e.g., 8) of integrated signals in the descending order according to the level to the controller 51 instead of outputting all the integrated signals of the respective frequency BIN ($BIN_A(1)$ to $BIN_A(5000)$).

The controller 51 detects the frequency of the interference wave signal based on the intensities (signal levels) of the integrated signals of the respective frequency BIN (each of $BIN_A(1)$ to $BIN_A(5000)$). Note that, when the limited number of integrated signals are inputted as described above, the controller 51 detects the frequency of the interference wave signal based on the intensities of these inputted integrated signals.

Specifically, for example, the controller 51 sets an interference wave signal detection threshold and determines that the interference wave signal exists at the frequency $BIN_A$ where the integrated signal higher than the interference wave signal detection threshold is detected. Note that, for example, this threshold may be set to a value obtained by integrating a predetermined value to an integrated value of the signal intensities of the GNSS signals in the output signals $S_O$ in a predetermined period of time. Further, in a case where a reception status (e.g., C/No) of the GNSS signals can be determined, the threshold may be set according to the reception status.

The controller 51 sets the interference wave signal frequency to the central frequency of the frequency $BIN_A$ where the existence of the interference wave signal is detected. Here, in a case where the controller 51 detects a plurality of frequencies, it sets the interference wave signal frequency to the frequency with the highest signal intensity. Alternatively, if the detection results are sequentially obtained, the interference wave signal frequency may be set to the frequency with the longest detection period of time. Note that, the detection of such interference wave signal frequencies is not limited to be based on the integrated values of the signal intensities, and may use integrated values of signal powers, etc.

The controller 51 sets an attenuation band setting signal $S_{CN}$ formed of the detected interference wave signal frequency. The controller 51 outputs the attenuation band setting signal $S_{CN}$ to the notch filter 52.

Here, the interference wave signal frequency detected by the controller 51 has a detection error only by the width $BWf_{ABIN}$ of the scan frequency BIN of the entire-range frequency scanner 53, and the attenuation frequency bandwidth is set to the width of this frequency error. For example, if the width $BWf_{ABIN}$ of the scan frequency BIN is 1 kHz, the attenuation frequency bandwidth may be set to ±1 kHz. Thus, even in the state of including the detection error, the degradation of the interference wave signal removing effect produced by the notch filter 52 can be suppressed.

The notch filter 52 includes a down-converter 501, a low-pass filter 502 corresponding to the "baseband signal generator" of the present invention, an integrator 503 corresponding to the "subtracting element" of the present invention, and an up-converter 504.

The down-converter 501 is inputted with an input signal $S_i$ that is the IF signal from the ADC 40 and the attenuation pole setting signal $S_{CN}$ from the controller 51. The down-converter 501 mixes the input signal $S_i$ with the attenuation pole setting signal $S_{CN}$ and outputs a down-converted signal $S_D$. The down-converted signal $S_D$ is inputted to the low-pass filter 502 and the integrator 503.

The low-pass filter 502 low-pass-filters the down-converted signal $S_D$ to output a baseband signal $S_{BL}$. This baseband signal $S_{BL}$ corresponds to a baseband component of the signal obtained by mixing the input signal $S_i$ containing the interference wave signal with the attenuation pole setting signal $S_{CN}$ formed of the interference wave signal frequency. Therefore, the baseband signal $S_{BL}$ serves as a signal showing a state of the interference wave signal. That is, the signal intensity of the baseband signal $S_{BL}$ increases when the signal intensity of the interference wave signal is high, and the signal intensity of the baseband signal $S_{BL}$ becomes 0 (zero) when the interference wave signal is eliminated. This baseband signal $S_{BL}$ is inputted to the integrator 503.

The integrator 503 subtracts the down-converted signal $S_D$ by the baseband signal $S_{BL}$. By performing such processing, the component of the interference wave signal contained in the down-converted signal $S_D$ is removed. The integrator 503 outputs the subtracted signal $S_S$ to the up-converter 504.

The up-converter 504 outputs the output signal $S_O$ obtained by mixing the subtracted signal $S_S$ with the attenuation pole setting signal $S_{CN}$ to the acquirer/tracker 60.

Thus, when the interference wave signal is contained in the reception signals of the GNSS antenna 20, the output signals $S_O$ inputted to the acquirer/tracker 60 are comprised of the signals which are the reception signals from which the interference wave signal is removed. That is, the output signals $S_O$ formed only of the GNSS signals are outputted to the acquirer/tracker 60.

The frequency scanning over the scan frequency band $BWf_A$ by the entire-range frequency scanner 53 as described above and the removal of the interference wave signal based on this scanning result are repeatedly performed. That is, as a certain one frequency scanning over the scan frequency band $BWf_A$ ends, the next frequency scanning over the scan frequency band $BWf_A$ simultaneously starts, and this is repeated. Then, the interference wave signal detection is performed for every one scanning and it is reflected onto the notch filter 52.

On top of such an entire-range frequency scanning, the interference wave signal remover 50 of this embodiment performs processing of calculating the estimation of frequency error corresponding to the detection error of the interference wave signal frequency detected based on the scanning result of the entire-range frequency scanner 53. Then, the interference wave signal remover 50 corrects the interference wave signal frequency by the calculated estimation of frequency error and reflects it in the setting of the attenuation pole setting signal $S_{CN}$ to the notch filter 52.

The controller 51 outputs the attenuation pole setting signal $S_{CN}$ described above to the notch filter 52 and sets a local scan frequency band $BWf_L$ and bandwidths $BWf_{LBiN}$ of local scan frequency $BIN_L$ ($BIN_L(M-2)$, $BIN_L(M-1)$, $BIN_L(M)$, $BIN_L(M+1)$, $BIN_L(M+2)$) for the local frequency scanner 54.

As illustrated in FIG. 7, the local scan frequency band $BWf_L$ is set such that a frequency bandwidth of the entire scan band is narrower and the width of each frequency BIN is also narrower, with respect to the scan frequency band $BWf_A$. For example, in the example of FIG. 7, the bandwidth of the local scan frequency band $BWf_L$ is ⅗ of the width $BWf_{ABIN}$ of the scan frequency $BIN_A$ of the entire-range frequency scanner 53, and the width of each local frequency $BIN_L$ is set to ⅕ of the width $BWf_{ABIN}$ of the scan frequency $BIN_A$ of the entire-range frequency scanner 53.

More specifically, for example, when the scan frequency band $BWf_A$ is set to 5 MHz as described above, the local scan frequency band $BWf_L$ is set to the frequency band of 0.6 kHz. The bandwidth $BWf_{ABIN}$ of the scan frequency $BIN_A$ is set to 1 kHz as described above, the width $BWf_{LBIN}$ of the local scan frequency $BIN_L$ is set to the frequency of 0.2 kHz.

Further, the local scan frequency band $BWf_L$ is set such that the central frequency of the frequency $BIN_A$ detected to contain the interference wave signal by the entire-range frequency scanner 53 becomes the central frequency of a central local frequency $BIN_L$ among the group of the local frequency $BIN_L$ configuring the local scan frequency band $BWf_L$.

Moreover, each local frequency $BIN_L$ is set such that the frequency bands partially overlap with each other between adjacent local frequency $BIN_L$ on the frequency axis. Specifically, as illustrated in FIG. 7, the frequency bands overlap with each other between the local frequency $BIN_L$ by half thereof. Under the above-described setting condition, 0.1 kHz of a higher side band of the local frequency $BIN_L(M-2)$ overlaps with 0.1 kHz of a lower side band of the local frequency $BIN_L(M-1)$. 0.1 kHz of a higher side band of the local frequency $BIN_L(M-1)$ overlaps with 0.1 kHz of a lower side band of the local frequency $BIN_L(M)$. 0.1 kHz of a higher side band of the local frequency $BIN_L(M)$ overlaps with 0.1 kHz of a lower side band of the local frequency $BIN_L(M+1)$. 0.1 kHz of a higher side band of the local frequency $BIN_L(M+1)$ overlaps with 0.1 kHz of a lower side band of the local frequency $BIN_L(M+2)$.

The local frequency scanner 54 is inputted with the input signals $S_i$ of the notch filter 52. Over the entire range of the local scan frequency band $BWf_L$, the local frequency scanner 54 integrates signal intensities of the input signals $S_i$ to calculate an integrated value (integrated signal) for each local scan frequency $BIN_L$ (each of $BIN_L(M-2)$, $BIN_L(M-1)$, $BIN_L(M)$, $BIN_L(M+1)$, $BIN_L(M+2)$). In the setting example described above, the integrating time period of each local frequency $BIN_L$ by the local frequency scanner 54 is 5 msec. Here, the frequency bands do not overlap among the three local scan frequency $BIN_L(M-2)$, $BIN_L(M)$ and $BIN_L(M+2)$, and thus, the total scanning time period for the entire local scan frequency band $BWf_L$ only requires 15 msec, resulting in a significantly short total scan time period compared to the total scanning time period (5 sec) with the entire-range frequency scanner 53. Moreover, in this case, the frequency resolution in the interference wave signal detection by the local frequency scanner 54 becomes 0.2 kHz (±0.1 kHz).

Thus, the local frequency scanner 54 can continuously perform the scanning of the interference wave signal frequency in higher accuracy at a short cycle on the local frequency band which is a narrower frequency band than the scanning by the entire-range frequency scanner 53 but the interference wave signal exists therein.

The local frequency scanner 54 outputs the integrated signals of the respective detected local scan frequency $BIN_L$ to the controller 51.

Figure 8:
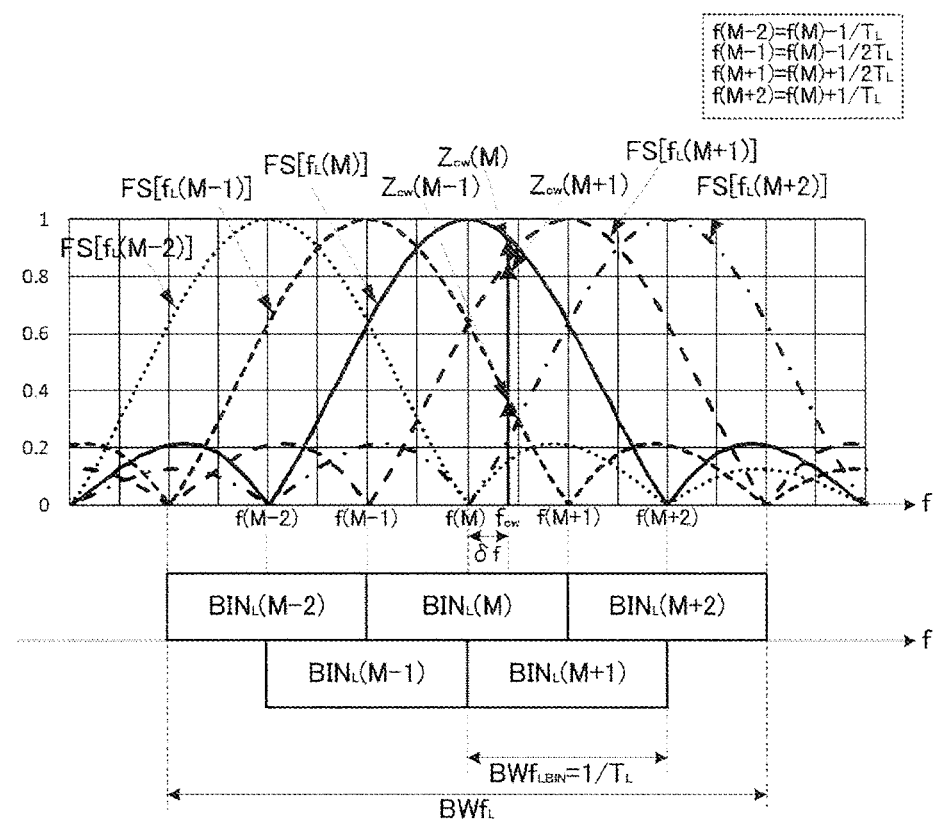
FIG. 8 is a view for describing an estimate calculation concept of a frequency error $\delta f$ of an interference wave signal frequency.

The controller 51 calculates an estimation of frequency error $\delta f$ of the interference wave signal frequency by using the following principle, based on the integrated signals of the respective local scan frequency $BIN_L$. FIG. 8 is a view for describing an estimate calculation concept of the frequency error $\delta f$ of the interference wave signal frequency, which illustrates a relation among the frequency bands of the respective local scan frequency $BIN_L$, respective sinc functions thereof, and a frequency $f_{CW}$ of a real interference wave signal CW.

In FIG. 8, $FS[f_L(M)]$ indicates the sinc function of the local frequency $BIN_L(M)$ of which the central frequency is $f(M)$, and $FS[f_L(M+1)]$ indicates the sinc function of the local frequency $BIN_L(M+1)$ of which the central frequency is $f(M+1)$ which is on the higher frequency side by one frequency BIN from the local frequency $BIN_L(M)$, and $FS[f_L(M+2)]$ indicates the sinc function of the local frequency $BIN_L(M+2)$ of which the central frequency is $f(M+2)$ which is on the higher frequency side by one frequency BIN from the local frequency $BIN_L(M+1)$. $FS[f_L(M-1)]$ indicates the sinc function of the local frequency $BIN_L(M-1)$ of which the central frequency is $f(M-1)$ which is on the lower frequency side by one frequency BIN from the local frequency $BIN_L(M)$, and $FS[f_L(M-2)]$ indicates the sinc function of the local frequency $BIN_L(M-2)$ of which the central frequency is $f(M-2)$ which is on the lower frequency side by one frequency BIN from the local frequency $BIN_L(M-1)$. Here, when the integrating time period is T, the frequency bandwidth BW of each frequency BIN is $1/T_L(=1/T)$, the central frequency $f(M+1)=f(M)+1/2T_L$, the central frequency $f(M+2)=f(M)+1/T_L$, the central frequency $f(M-1)=f(M)-1/2T_L$, and the central frequency $f(M-2)=f(M)-1/T_L$. Moreover, $Z_{CW}(M)$ is the integrated signal level of the interference wave signal at the local frequency $BIN_L(M)$ where the interference wave signal is detected, $Z_{CW}(M+1)$ is the integrated signal level of the interference wave signal at the local frequency $BIN_L(M+1)$, and $Z_{CW}(M-1)$ is the integrated signal level of the interference wave signal at the local frequency $BIN_L(M-1)$.

The controller 51 calculates the estimation of frequency error $\delta f$ by using that the frequency error $\delta f$ at the local frequency $BIN_L(M)$ having the interference wave signal frequency detected by the entire-range frequency scanner 53 as its central frequency is dependent on the levels $Z_{CW}(M+1)$ and $Z_{CW}(M-1)$ of the integrated signal levels of the respective local frequency bands $BIN_L(M-1)$ and $BIN_L(M+1)$ adjacent to the local frequency $BIN_L(M)$, and the frequency error $\delta f$ is in a relation based on the following Equation (3) with the levels $Z_{CW}(M+1)$ and $Z_{CW}(M-1)$ of the integrated signal levels of the respective local frequency bands $BIN_L(M-1)$ and $BIN_L(M+1)$.

$$\delta f = \frac{1}{2T} \frac{Z_{cw}(M+1) - Z_{cw}(M-1)}{Z_{cw}(M+1) + Z_{cw}(M-1)} \quad (3)$$

The controller 51 corrects the calculated estimation of frequency error $\delta f$ by integrating it to the central frequency of the frequency $BIN_A$ detected to contain the interference wave signal by the entire-range frequency scanner 53, and sets the attenuation band setting signal $S_{CN}$ based on the corrected highly-accurate interference wave signal frequency $f_{CW}$. The controller outputs the corrected attenuation band setting signal $S_{CN}$ to the notch filter 52. Thus, the attenuation frequency band based on the interference wave signal frequency detected highly accurately is set to the notch filter 52, and therefore, the interference wave signal can more surely and effectively be removed.

As described above, by using the configuration of this embodiment, the interference wave signal frequency can be set highly accurately and the interference wave signal removal can be performed effectively. Particularly, the frequency error $\delta f$ can be detected promptly by partially overlapping the bands of the plurality of frequency BIN only in the local frequency band which is the narrow frequency band near the interference wave signal frequency roughly detected in the entire-range frequency scanning as described in this embodiment, and calculating the frequency error $\delta f$ highly accurately. Therefore, highly-accurate update setting of the interference wave signal frequency can be performed promptly.

Moreover, since non-linear selecting operation is not used, even if the JNR degrades, the interference wave signal frequency can be detected highly accurately.

Note that, the frequency scanning over such a local scan frequency band $BWf_L$, and the correction of the interference wave signal frequency based on this scanning result thereof are repeatedly performed similarly to the frequency scanning by the entire-range frequency scanner 53 described above and the interference wave signal removal based on this scanning result. Thus, the interference wave signal frequency is gradually tracked down and a more-accurate and effective attenuation frequency band can be set to the notch filter 52.

Moreover, in the description above, the frequency error $\delta f$ is used for the correction as it is; however, by using the following low-pass filtering, the interference wave signal frequency $f_{CW}$ may be calculated based on the frequency error $\delta f$.

$$f_{CW}(t_k) = f_{CW}(t_{k-1}) + K \cdot \delta f \quad (4)$$

In Equation (4), $f_{CW}(t_k)$ is an estimated interference wave signal frequency at a time point $t_k$, $f_{CW}(t_{k-1})$ is an estimated interference wave signal frequency at a time point $t_{k-1}$ (sampling point immediately before the time point $t_k$ in an interference wave signal frequency estimation sampling cycle). K is a loop gain of a frequency estimation operation loop.

By performing such low-pass filtering, the effect of the measurement noise can be suppressed. Thus, an estimation of the interference wave signal frequency can be calculated more accurately.

Further, the local scan frequency band $BWf_L$, the number of the local scan frequency $BIN_L$, the width $BWf_{LBIN}$ of the local scan frequency BIN, and the overlapping frequency width of the adjacent local frequency $BIN_L$ may suitably be set according to the detection accuracy of the interference wave signal frequency and the attenuation frequency band and the like of the notch filter.

Figure 9:
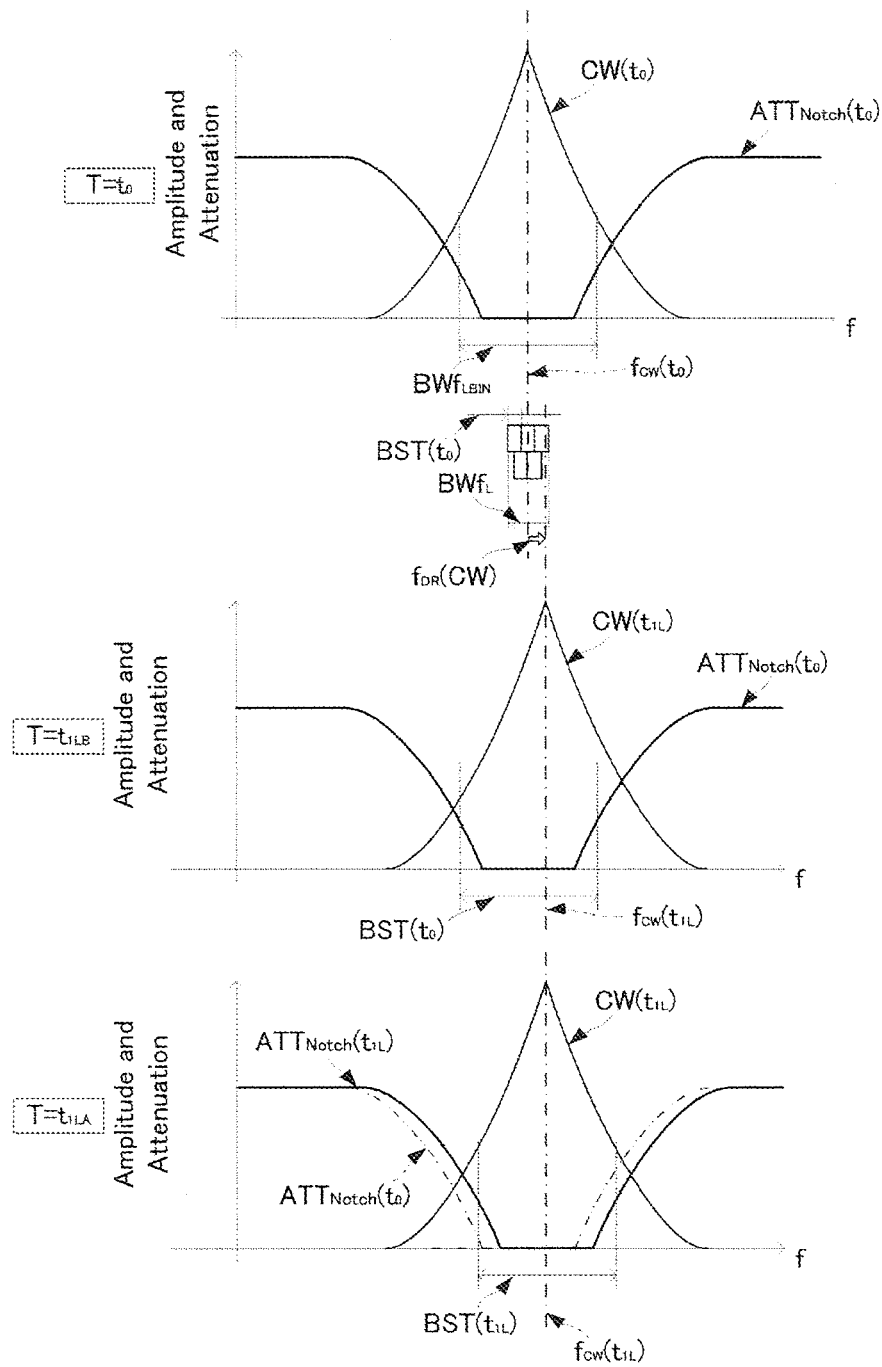
FIG. 9 illustrates charts for describing a concept of tracking a frequency drift-type interference wave signal and removing it with a configuration and processing of the first embodiment.

Moreover, the calculation of such a frequency error $\delta f$ can also be used in a case of tracking a frequency drift-type interference wave signal of which the frequency drifts with time, while detecting a frequency thereof highly accurately. FIG. 9 illustrates charts for describing a concept of tracking the frequency drift-type interference wave signal and removing it with the configuration and processing of this embodiment.

In FIG. 9, $CW(t_0)$ indicates the spectrum of the interference wave signal at a time point $t_0$ and $f_{CW}(t_0)$ indicates the frequency thereof. $ATT_{Notch}(t_0)$ indicates the attenuation property of the notch filter 52 set at the time point $t_0$. $BST(t_0)$ is an attenuation band of the notch filter 52 set at the time point $t_0$. $f_{DR}(CW)$ indicates a frequency drift amount of the interference wave signal CW in the scanning time period of the entire local scan frequency band $BWf_L$.

$CW(t_{1L})$ indicates the spectrum of the interference wave signal at the time point $t_{1L}$ (=$t_0$+(total scanning time period of the entire local scan frequency band $BWf_L$)), and $f_{CW}(t_{0L})$ indicates the frequency thereof. $ATT_{Notch}(t_{1L})$ indicates the attenuation property of the notch filter 52 set at the time point $t_{1L}$.

Firstly, as the frequency $f_{CW}(t_0)$ of the interference wave signal is detected at a time point $T=t_0$ and the attenuation band $BST(t_0)$ of the notch filter 52 is set by having the frequency $f_{CW}(t_0)$ as the central frequency, the interference wave signal $CW(t_0)$ will be in the attenuation band $BST(t_0)$ at this timing, and the interference wave signal $CW(t_0)$ is removed by the notch filter 52.

When the detected interference wave signal is the frequency drift-type, at the timing when the time point $T=t_{1L}$ which is after the total scanning time period of the entire local scan frequency band $BWf_L$, the frequency $f_{CW}(t_{1L})$ of the interference wave signal CW will be $f_{CW}(t_0)+f_{DR}(CW)$.

Here, if the frequency bandwidth of the attenuation band BST of the notch filter 52 is suitably set, as illustrated in the middle row of FIG. 9, even after the frequency drift at the timing when the time point $T=t_{1L}$, the interference wave signal $CW(t_{1L})$ is substantially entirely in the attenuation band $BST(t_0)$ and removed by the notch filter 52.

Moreover, the frequency drift amount $f_{DR}(CW)$ at the frequency drift speed of the interference wave signal can be considered as the frequency error δf at the timing when the time point $T=t_{1L}$ with respect to the interference wave signal frequency at the timing when the time point $T=t_0$.

Therefore, the frequency drift amount $f_{DR}(CW)$ detected as above is detected by the controller 51 and processed similarly to the frequency error δf used for the correction of the interference wave signal frequency described above, and thus, it can be used for the update setting of the attenuation frequency band of the notch filter 52.

Thus, as illustrated in the lowest row of FIG. 9, the notch filter 52 is changed in its setting to a filter of which the central frequency is $f_{CW}(t_{1L})$ and the attenuation $BST(t_{1L})$, and even the frequency drift-type interference wave signal can be removed continuously.

The frequency scanning over such a local scan frequency band $BWf_L$, and the frequency detection (frequency tracking) of the interference wave signal based on the scanning result thereof are repeatedly performed similarly to the frequency scanning by the entire-range frequency scanner 53 described above and the interference wave signal removal based on the scanning result thereof. Thus, even if the interference wave signal is the frequency drift-type, the frequency thereof can be surely tracked and be removed continuously. Note that, when tracking the interference wave signal, the local scan frequency band $BWf_L$ is more preferably suitably be set based on the drift speed of the interference wave signal and the attenuation frequency band of the notch filter.

Moreover, by using the configuration and the processing described above, since a time difference is not used for the detection of the frequency error, there is no limitation that a time interval needs to be within one cycle of the signal as the normal FLL (Frequency Locked Loop). Therefore, a frequency drawing range will not be lost even if the time interval of the frequency error detection is long, and thus, the operation rate of tracking the frequency can be reduced. Thus, an increase of a signal processing load can be prevented.

Moreover, in the above configuration, the notch filter 52 may output the baseband signal $S_{BL}$ to the controller 51. In this case, the controller 51 can perform the following processing.

The controller 51 determines whether to continue or stop the output of the attenuation pole setting signal $S_{CN}$ based on the signal intensity of the baseband signal $S_{BL}$ which is outputted from the notch filter 52. Specifically, the controller 51 sets a determination threshold for the signal intensity of the baseband signal $S_{BL}$, and if the signal intensity is higher than the determination threshold, the attenuation pole setting signal $S_{CN}$ is continuously outputted to the notch filter 52. Thus, the interference wave signal removal continues. If the signal intensity of the baseband signal $S_{BL}$ is lower than the determination threshold, the controller 51 stops the output of the attenuation pole setting signal $S_{CN}$ to the notch filter 52. Thus, the highly accurate detection of the interference wave signal frequency and the highly accurate tracking of the interference wave signal described above and, when the interference wave signal is eliminated, the interference wave signal attenuation function of the notch filter 52 can be stopped more rapidly.

Figure 10:
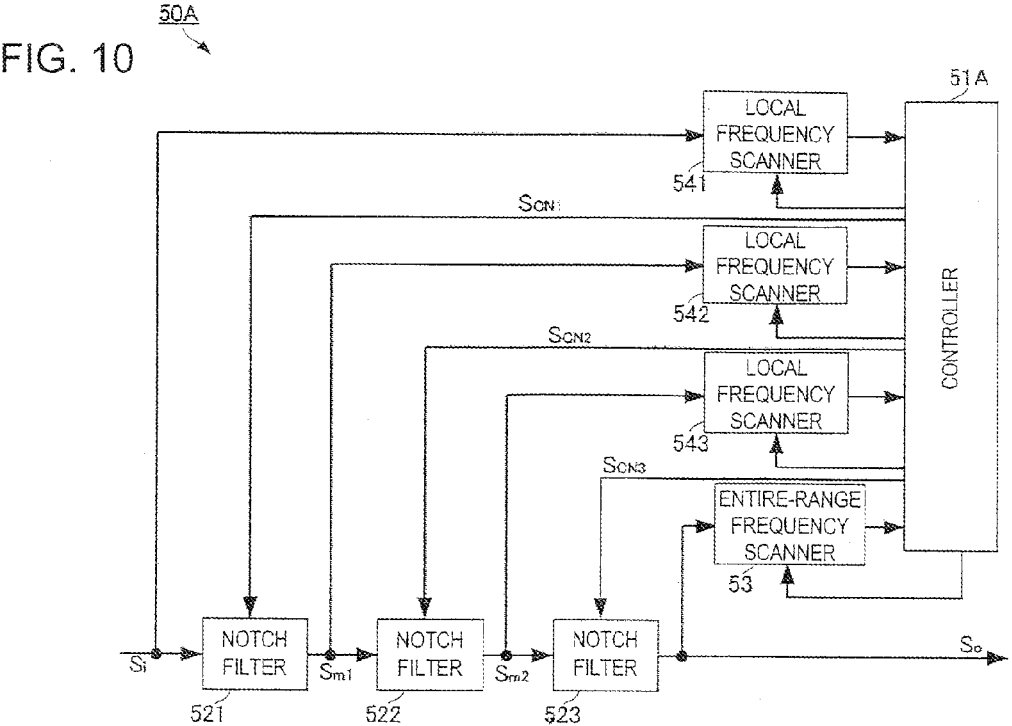
FIG. 10 is a block diagram of an interference wave signal remover 50A with multi-staged notch filters according to a second embodiment.

Next, an interference wave removing device (interference wave remover) according to a second embodiment is described with reference to the drawings. FIG. 10 is a block diagram of an interference wave signal remover 50A with multi-staged notch filters according to the second embodiment. Note that in FIG. 10, a case where three notch filters are used is illustrated; however, it may be two, four or more.

In the above embodiment, the configuration and processing for removing only one interference wave signal from the reception signals is described; however, a plurality of interference wave signals may actually be contained in the reception signals. In such a case, the interference wave signal remover 50A having the following configuration may be used.

The interference wave signal remover 50A includes a plurality of notch filters 521, 522 and 523. Moreover, the interference wave signal remover 50A includes a plurality of local frequency scanners 541, 542 and 543 corresponding to the number of notch filters.

The notch filters 521, 522 and 523 have the same structure, which is the above-described structure illustrated in FIG. 6. In the notch filter 521, a down-converter side is connected with the ADC 40 (not illustrated) and an up-converter side is connected with a down-converter side of the notch filter 522. An up-converter side of the notch filter 522 is connected with a down-converter side of the notch filter 523, and an up-converter side of the notch filter 523 is connected with an acquirer/tracker 60 (not illustrated).

The interference wave signal remover 50A having such a configuration operates as follows.

Firstly, when the IF signals are inputted to an entire-range frequency scanner 53, for output signals $S_O$ of the final-stage notch filter 523, the entire-range frequency scanner 53 calculates an integrated signal of the output signals $S_O$ for every width $BWf_{ABIN}$ of the scan frequency $BIN_A$ over the entire range of the scan frequency band $BWf_A$. The entire-range frequency scanner 53 outputs the integrated signals of the respective scan frequency $BIN_A$ to a controller 51A.

The controller 51A detects the interference wave signal frequency based on the signal intensities of the integrated signals of the respective scan frequency $BIN_A$ from the entire-range frequency scanner 53 as described above. Here, the controller 51A detects the interference wave signals for the number of notch filters provided to the interference wave signal remover 50A. If the number of detected interference wave signals is larger than the number of notch filters, the interference wave signals with a high signal intensity or having a long period of time of the signal intensities continuing to be higher than a threshold are preferentially detected.

The controller 51A generates attenuation pole setting signals $S_{CN1}$, $S_{CN2}$ and $S_{CN3}$ for the respective detected interference wave signal frequencies, and outputs them to the respective notch filters 521, 522 and 523. The controller 51A outputs the attenuation pole setting signal $S_{cN1}$ to the notch filter 521, the attenuation pole setting signal $S_{CN2}$ to the notch filter 522, and the attenuation pole setting signal $S_{CN3}$ to the notch filter 523, respectively. Note that, when the number of detected interference wave signal frequencies is smaller than the number of notch filters, the attenuation pole setting signals may be generated by the number of interference wave signal frequencies.

The notch filter 521 uses the attenuation pole setting signal $S_{CN1}$ to remove a first interference wave signal from the input signal $S_i$, and outputs the primary removal-processed signal $S_{m1}$ to the notch filter 522. The notch filter 522 uses the attenuation pole setting signal $S_{CN2}$ to remove a second interference wave signal from the primary removal-processed signal $S_{m1}$, and outputs the secondary removal-processed signal $S_{m2}$ to the notch filter 523. The notch filter 523 uses the attenuation pole setting signal $S_{CN3}$ to remove a third interference wave signal from the secondary removal-processed signal $S_{m2}$, and outputs the third removal-processed signal $S_{m3}$ to the acquirer/tracker 60 as an output signal $S_O$.

The controller 51A performs processing of outputting the attenuation range setting signal $S_{CN1}$ to the notch filter 521 and sets a local scan frequency band $BWf_{L1}$ and a bandwidth $BWf_{LBIN1}$ of a local scan frequency $BIN_{L1}$ to the local frequency scanner 541. The controller 51A performs processing of outputting the attenuation range setting signal $S_{CN2}$ to the notch filter 522 and sets a local scan frequency band $BWf_{L2}$ and a bandwidth $BWf_{LBIN2}$ of a local scan frequency $BIN_{L2}$ to the local frequency scanner 542. The controller 51A performs processing of outputting the attenuation range setting signal $S_{CN3}$ to the notch filter 523 and sets a local scan frequency band $BWf_{L3}$ and a bandwidth $BWf_{LBIN3}$ of a local scan frequency $BIN_{L3}$ to the local frequency scanner 543.

Here, the controller 51A sets the respective local frequency $BIN_L$ for the respective local scan frequency bands $BWf_{L1}$, $BWf_{L2}$ and $BWf_{L3}$ such that adjacent local frequency $BIN_L$ overlap with each other, similarly to the controller 51 described above.

The local frequency scanner 541 is inputted with the input signals $S_i$. Over the entire range of the local scan frequency band $BWf_{L1}$, the local frequency scanner 541 calculates an integrated signal of the input signals $S_i$ at each local scan frequency $BIN_{L1}$. The local frequency scanner 541 outputs the integrated signals of the respective local scan frequency $BIN_{L1}$ to the controller 51A.

The controller 51A detects a frequency error $\delta f_1$ based on signal intensities of the integrated signals of the respective local scan frequency $BIN_{L1}$ from the local frequency scanner 541. The controller 51A performs a similar correction to the first embodiment on the interference wave signal frequency for the notch filter 521 detected based on the scanning result of the entire-range frequency scanner 53, by the frequency error $\delta f_1$. The controller 51A updates the attenuation band setting signal $S_{CN1}$ based on the corrected interference wave signal frequency, and outputs it to the notch filter 521.

The local frequency scanner 542 is inputted with the primary removal-processed signals $S_{m1}$. Over the entire range of the local scan frequency band $BWf_{L2}$, the local frequency scanner 542 calculates an integrated signal of the primary removal-processed signals $S_{m1}$ for each local scan frequency $BIN_{L2}$. The local frequency scanner 542 outputs the integrated signals of the respective local scan frequency $BIN_{L2}$ to the controller 51A.

The controller 51A detects a frequency error $\delta f_2$ based on signal intensities of the integrated signals of the respective local scan frequency $BIN_{L2}$ from the local frequency scanner 542. The controller 51A performs a similar correction to the first embodiment on the interference wave signal frequency for the notch filter 522 detected based on the scanning result of the entire-range frequency scanner 53, by the frequency error $\delta f_2$. The controller 51A updates the attenuation band setting signal $S_{CN2}$ based on the corrected interference wave signal frequency, and outputs it to the notch filter 522.

The local frequency scanner 543 is inputted with the secondary removal-processed signals S. Over the entire range of the local scan frequency band $BWf_{L3}$, the local frequency scanner 543 calculates an integrated signal of the secondary removal-processed signals $S_{m2}$ at each local scan frequency $BIN_{L3}$. The local frequency scanner 543 outputs the integrated signals of the respective local scan frequency $BIN_{L3}$ to the controller 51A.

The controller 51A detects a frequency error $\delta f_3$ based on signal intensities of the integrated signals of the respective local scan frequency $BIN_{L3}$ from the local frequency scanner 543. The controller 51A performs a similar correction to the first embodiment on the interference wave signal frequency for the notch filter 523 detected based on the scanning result of the entire-range frequency scanner 53, by the frequency error $\delta f_3$. The controller 51A updates the attenuation band setting signal $S_{CN3}$ based on the corrected interference wave signal frequency, and outputs it to the notch filter 523.

By having such a configuration, interference wave signal frequencies can be detected highly accurately from each of a plurality of interference wave signals. Thus, the effective interference wave signal removal by the notch filters becomes available, and an interference wave signal remover that is more practical can be realized.

Moreover, also in a case of using such a plurality of notch filters, similar to the first embodiment described above, the tracking of the frequencies of the interference signals can be performed based on the frequency errors $\delta f_1$, $\delta f_2$ and $\delta f_3$ outputted from the respective local frequency scanners 541, 542 and 543.

Figure 11:
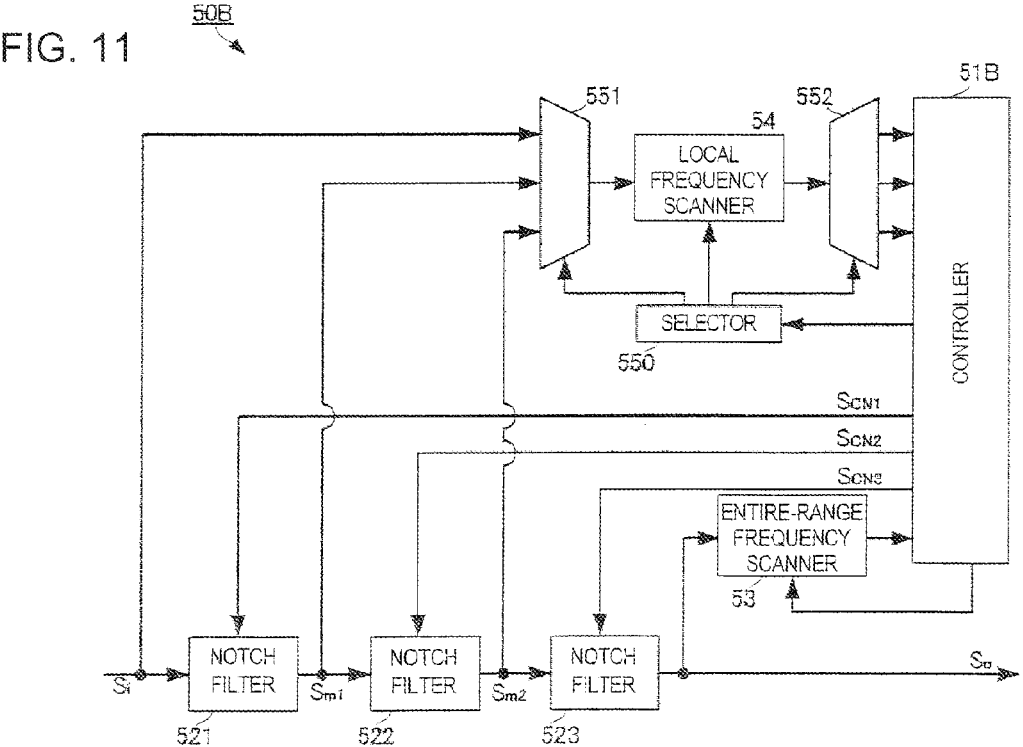
FIG. 11 is a block diagram of an interference wave signal remover 50B with multi-staged notch filters according to a third embodiment.

Next, an interference wave signal removing device (interference wave remover) according a third embodiment is described with reference to the drawings. FIG. 11 is a block diagram of an interference wave signal remover 50B with multi-staged notch filters according to the third embodiment. Note that, also in FIG. 11, a case where three notch filters are used is illustrated; however, it may be two, four or more.

The interference wave signal remover 50B of this embodiment is only different regarding the components for performing a local frequency scanning, and other configuration thereof is the same as that of the interference wave signal remover 50A described in the second embodiment.

A multiplexer 551 is connected before a local frequency scanner 54 having a similar configuration to that of the above embodiments. A demultiplexer 552 is connected after the local frequency scanner 54.

A selector 550 is inputted with scan target selected information, and information regarding a local scan frequency band $BWf_L$, and a bandwidth $BWf_{LBIN}$ of a local scan frequency BIN from a controller 51B. The scan target selected information is information for selecting which one of the plurality of notch filters 521, 522 and 523 of which the corresponding local frequency scanning is to be performed. Moreover, the local scan frequency band $BWf_L$, and the bandwidth BWf$_{LBIN}$ of the local scan frequency BIN are set according to the selected notch filter.

The selector 550 outputs the selected signal to the multiplexer 551 and the multiplexer 552 according to the scan target selected information. Moreover, the selector 550 sets the local scan frequency band BWf$_L$, and the bandwidth BWf$_{LBIN}$ of the local scan frequency BIN to the local frequency scanner 54. Specifically, the local frequency scanner 54 operates as follows by the processing of the selector 550.

When the notch filter 521 is selected, the multiplexer 551 performs a switch operation to input the input signals S$_i$ to the local frequency scanner 54. The local frequency scanner 54 scans frequencies in the local scan frequency band BWf$_{L1}$ with a bandwidth BWf$_{L1BIN}$ of the local scan frequency BIN$_{L1}$. The demultiplexer 552 performs a switch operation to output the integrated signals of the respective local scan frequency BIN$_{L1}$ to a setting module of the controller 51B for the notch filter 521.

When the notch filter 522 is selected, the multiplexer 551 performs a switch operation to input the primary removal-processed signals S$_{m1}$ to the local frequency scanner 54. The local frequency scanner 54 scans frequencies in the local scan frequency band BWf$_{L2}$ with a bandwidth BWf$_{L2BIN}$ of the local scan frequency BIN$_{L2}$. The demultiplexer 552 performs a switch operation to output the integrated signals of the respective local scan frequency BIN$_{L2}$ to a setting module of the controller 51B for the notch filter 522.

When the notch filter 523 is selected, the multiplexer 551 performs a switch operation to input the secondary removal-processed signals S$_{m2}$ to the local frequency scanner 54. The local frequency scanner 54 scans frequencies in the local scan frequency band BWf$_{L3}$ with the bandwidth BWf$_{L3BIN}$ of the local scan frequency BIN$_{L3}$. The demultiplexer 552 performs a switch operation to output the integrated signals of the respective local scan frequency BIN$_{L3}$ to a setting module of the controller 51B for the notch filter 523.

Even with such a configuration, a plurality of interference wave signal frequencies can be detected and removed respectively in high accuracy. Moreover, with this configuration, even with one local frequency scanner, a plurality of interference wave signal frequencies can be tracked.

By using any one of the interference wave signal removers having configurations described in the respective embodiments above, the acquirer/tracker 60 is inputted with the signals only containing the GNSS signals, and thus, the acquisition and tracking ability can be improved. For example, the acquiring speed or the tracking speed improves, and the tracking accuracy can be improved. Moreover, due to the tracking accuracy improvement, the accuracy of the pseudorange and the like improves and the navigation message can surely be demodulated, and a highly accurate positioning result can be obtained.

Note that, the mode of the processing of the controllers and the frequency scanners described in the respective embodiments above may be such that it is programmed to be saved in a hard disk, a ROM or the like, and executed by a computer.

Figure 12:
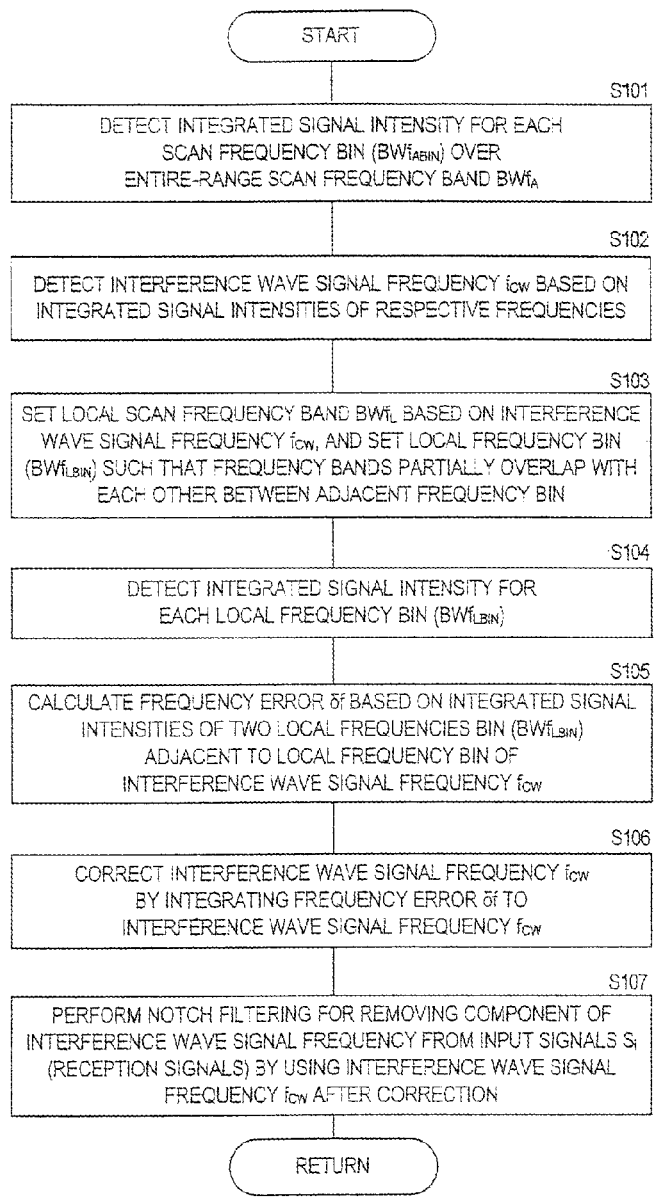
FIG. 12 is a flowchart illustrating an interference wave signal removing method according to the present invention.

In this case, for example, it may such that the method illustrated in the flowchart shown in FIG. 12 is realized. FIG. 12 is a flowchart illustrating an interference wave signal removing method according to the present invention. Note that, in FIG. 12, the case where the number of notch filters is one is shown; however, when the number of notch filters is plural as described above, the method illustrated in FIG. 12 may be applied to each notch filter.

Firstly, over an entire-range scan frequency band BEf$_A$, an integrated signal intensity is detected for each scan frequency BIN having a bandwidth BWf$_{ABIN}$ (S101). The interference wave signal frequency f$_{CW}$ is detected based on the integrated signal intensities of the respective scan frequency BIN (S102).

The local scan frequency band BWf$_L$, is set based on the interference wave signal frequency f$_{CW}$, and the plurality of local frequency BIN each having a bandwidth BWf$_{LBIN}$ (<BWf$_{ABIN}$) by which the local scan frequency band BWf$_L$, is divided are set. Here, each local frequency BIN is set such that the frequency bands partially overlap with each other between adjacent local frequency BIN on the frequency axis (S103). The integrated signal intensity is detected for each local frequency BIN (S104). Here, at least the integrated signal intensities of adjacent frequency BIN on the frequency axis among the local frequency BIN containing the interference wave signal frequency f$_{CW}$ are detected.

Based on Equation (3) described above, the frequency error δf is calculated from the integrated signal intensities of adjacent frequency BIN on the frequency axis among the local frequency BIN containing the interference wave signal frequency f$_{CW}$ (S105). The interference wave signal frequency f$_{CW}$ is corrected by integrating the frequency error δf to the interference wave signal frequency f$_{CW}$ (S 106).

The notch filtering is performed for removing components of the interference wave signal frequency f$_{CW}$ from the input signals S$_i$ (reception signals) by using the corrected interference wave signal frequency f$_{CW}$ (S107). Note that, this processing of calculating the detected frequency error δf of the interference wave signal frequency f$_{CW}$, and correcting and update-setting the interference wave signal frequency f$_{CW}$ is performed continuously until the elimination of the relevant interference wave signal is detected.

Moreover, in the respective embodiments described above, the frequency bands of the adjacent local scan frequency BIN$_L$ are set to overlap with each other in the setting of the local frequency BIN$_L$ of the local frequency scanner; however, also for the scan frequency BIN$_A$ of the entire-range frequency scanner 53, the frequency bands of the adjacent scan frequency BIN$_A$ are set to overlap with each other.

Figure 13:
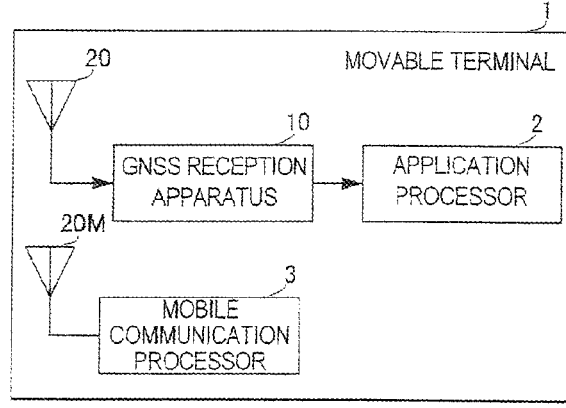
FIG. 13 is a block diagram of a main configuration of a mobile terminal 1 including the GNSS reception apparatus 10.

Moreover, the GNSS reception apparatus 10 having the configuration as described above may be used in a movable terminal 1 as illustrated in FIG. 13. FIG. 13 is a block diagram of a main configuration of the mobile terminal 1 including the GNSS reception apparatus 10.

The movable terminal 1 as illustrated in FIG. 13 is a mobile communicator such as a mobile phone, and it includes an GNSS antenna 20, the GNSS reception apparatus 10, an application processor 2, a mobile communication antenna 20M, and a mobile communication processor 3.

The application processor 2 displays a self-device position and a self-device speed based on the obtained positioning result outputted from the GNSS reception apparatus 10, uses the same for navigation, and executes various applications using the self-device position.

The mobile communication antenna 20M transceives a mobile communication signal (transmission signal and reception signal). The mobile communication processor 3 generates the transmission signal for mobile communication and demodulates the reception signal for mobile communication.

With such a configuration, by using the GNSS reception apparatus 10 including any one of the interference wave signal removers described above, even if the mobile communication signal is close to the frequency of the GNSS signal and has a high signal intensity, it is surely removed by the interference wave signal remover, and the reception sensitivity of the GNSS signal does not degrade. Thus, a highly accurate positioning result can be obtained and highly accurate position display and navigation and the like can be realized. Moreover, since it becomes possible to draw the frequency band of the mobile communication signal close to the frequency band of the GNSS signal, a useable frequency band of the mobile communication signal widens and the mobile terminal 1 can be configured to be more user-friendly.

Note that, in the above description, a case is shown where the functional component realizing the mobile function and the application function utilizing a positioning result obtained by using the GNSS signals are provided in one housing; however, even in a case with a movable terminal that does not include the functional component realizing the mobile function and undesirably receives mobile communication signals externally, similar operations and effects can be obtained.

DESCRIPTION OF REFERENCE NUMERALS

100P: Interference Wave Removing Device; 101P: Controller; 102P: Notch Filter; 103P: Frequency Analyzer; 104P: Frequency Scanner; 10: GNSS Receiving Apparatus; 20: GNSS Antenna; 30: RF Front End Circuit; 40: Analog-Digital Converter (ADC); 50, 50A, 50B: Interference Wave Signal Remover; 60: Acquirer/tracker; 70: Positioning Operator; 51, 51A, 51B: Controller; 52, 521, 522, 523: Notch Filter; 53: Entire-range Frequency Scanner; 54, 541, 542, 543: Local Frequency Scanner; 501: Down-Converter; 502: Low-Pass Filter; 503: Integrator; 504: Up-Converter; 550: Selector; 551: Multiplexer; 552: Demultiplexer; 1: Mobile Terminal; 2: Application Processor; 3: Mobile Communication Processor; and 20M: Mobile Communication Antenna

The invention claimed is:

1. An interference wave signal removing device for removing an interference wave signal different from a desired signal that is contained in reception signals, comprising:
   a notch filter adjustable of an attenuation frequency band;
   a frequency scanner for outputting integrated signals of the reception signals at each of a plurality of frequency bins which each have a predetermined frequency width; and
   a controller for detecting a frequency of the interference wave signal and setting the attenuation frequency band of the notch filter based on intensities of the integrated signals of each of the plurality of frequency bins,
   wherein the controller calculates an estimation of error of the interference wave signal frequency based on the intensities of the integrated signals of each of the plurality of frequency bins, corrects the detected interference wave signal frequency by the estimation of error, and updates the attenuation frequency band of the notch filter based on the corrected detected interference wave signal frequency;
   wherein the frequency scanner includes:
      a first frequency scanner for frequency-scanning output signals that are the reception signals outputted through the notch filter in a first frequency band with a first frequency bandwidth, and outputting first integrated signals for each frequency bin in the first frequency bandwidth having frequency bands non-overlapped with each other; and
      a second frequency scanner for frequency-scanning the reception signals in a second frequency band with a second frequency bandwidth narrower than the first frequency bandwidth and based on the attenuation frequency band, and outputting second integrated signals for each frequency bin in the second frequency bandwidth having frequency bands that partially overlap with each other, and
   wherein the controller detects the interference wave signal frequency based on the first integrated signals and calculates the estimation of error of the interference wave signal based on the second integrated signals.

2. The interference wave signal removing device of claim 1, wherein the controller sets the interference wave signal frequency to be a central frequency of a single frequency bin where an intensity of the integrated signal of the single frequency bin is higher than a predetermined threshold, and the controller calculates the estimation of error of the interference wave signal frequency based on the intensities of the integrated signals of frequency bins adjacent to the single frequency bin of the interference wave signal frequency on a frequency axis.

3. The interference wave signal removing device of claim 2, wherein the controller corrects the interference wave signal frequency by correcting for the estimation of error to the interference wave signal frequency.

4. The interference wave signal removing device of claim 1, wherein the frequency width of the second frequency band is narrower than the frequency width of the first frequency band.

5. The interference wave signal removing device of claim 1, wherein the notch filter includes a plurality of notch filters that are connected in series,
   wherein a plurality of second frequency scanners is provided, one second frequency scanner for each of the plurality of notch filters,
   wherein each of the second frequency scanners provided for each notch filter scans the input signals of the notch filter in the second frequency band set to each second frequency scanner, and each second frequency scanner outputs the second integrated signals for each frequency bin in the second frequency bandwidth, and
   wherein based on the second integrated signals outputted from each second frequency scanner, the controller calculates the estimation of error of the interference wave signal frequency for each second frequency scanner and sets the attenuation frequency band to each notch filter based on the calculated estimation of error for each second frequency scanner.

6. The interference wave signal removing device of claim 1, wherein the controller performs low-pass filtering on the estimation of error.

7. The interference wave signal removing device of claim 1, wherein the notch filter includes:
   a down-converter for multiplying an input signal by an attenuation pole setting signal for setting the attenuation frequency band outputted from the controller;
   a baseband signal generator for generating a baseband signal by extracting a baseband component of the down-converted signal;
   a subtracting element for subtracting the baseband signal from the down-converted signal; and
   an up-converter for multiplying the subtracted signal by the attenuation pole setting signal, wherein the notch filter outputs the baseband signal to the controller, and wherein the controller detects removal of the interference wave signal based on the baseband signal and, when the successful removal of the interference wave signal is detected, cancels the setting of the attenuation frequency band to the notch filter.

8. A GNSS reception apparatus, comprising:
interference wave signal removing device of claim 1;
a receiver for receiving GNSS signals as desired signals, generating GNSS reception signals, and outputting them to the interference wave signal removing device;
an acquirer/tracker for acquiring and tracking the GNSS reception signals after the interference wave signal removal; and
a positioning operator for performing positioning by using the tracked GNSS signals.

9. A mobile terminal, comprising:
the GNSS reception apparatus of claim 8; and
an application processor for performing a predetermined application by using a positioning operation result of the positioning operator.

10. A non-transitory computer readable medium comprising instructions that when executed by a computer cause the computer to execute steps for removing an interference wave signal different from a desired signal that is contained in reception signals, said steps comprising:
calculating, in a scan frequency band comprised of a plurality of frequency bins, each having a predetermined frequency width, integrated signals of the reception signals at each of the plurality of frequency bins; and
detecting a frequency of the interference wave signal and setting an attenuation frequency band of a notch filter adjustable of the attenuation frequency band, based on intensities of the integrated signals of each of the plurality of frequency bins,
wherein the setting of the attenuation frequency band includes calculating an estimation of error of the interference wave signal frequency based on the intensities of the integrated signals of each of the plurality of frequency bins, correcting the detected interference wave signal frequency by the estimation of error, and updating the attenuation frequency band of the notch filter based on the corrected detected interference wave signal frequency;
wherein the calculating of the integrated signals includes:
frequency-scanning output signals that are the reception signals outputted through the notch filter in a first frequency band, and outputting first integrated signals of each of a plurality of frequency bins in a first frequency bandwidth that have frequency bands non-overlapped with each other; and
frequency-scanning the reception signals in a second frequency band with a second frequency bandwidth narrower than the first frequency bandwidth and based on the attenuation frequency band, and outputting second integrated signals at each of a plurality of frequency bins in the second frequency bandwidth having frequency bands that partially overlap with each other, and
wherein the setting of the attenuation frequency band includes detecting the interference wave signal frequency based on the first integrated signals and calculating the estimation of error of the interference wave signal frequency based on the second integrated signals.

11. The non-transitory computer readable medium of claim 10, wherein the second frequency bandwidth of the second frequency band is narrower than the first frequency bandwidth of the first frequency band.

12. The non-transitory computer readable medium of claim 10, wherein the frequency-scanning of the reception signals based on the attenuation frequency in the second frequency band is performed for each of a plurality of notch filters connected in series,
wherein the frequency-scanning of the reception signals for each notch filter in the second frequency band includes scanning input signals of the notch filter in the second frequency band for each notch filter, and calculating the second integrated signals for each frequency bin in the second frequency bandwidth, and
wherein the setting of the attenuation frequency band includes calculating the estimation of error of the interference wave signal frequency for each frequency bin in the second frequency bandwidth and setting the attenuation frequency band for each notch filter, based on the second integrated signals for each frequency bin in the second frequency bandwidth.

13. A method of removing an interference wave signal different from a desired signal that is contained in reception signals, comprising:
calculating, in a scan frequency band comprised of a plurality of frequency bins, each having a predetermined frequency width, integrated signals of the reception signals at each of the plurality of frequency bins; and
detecting a frequency of the interference wave signal and setting an attenuation frequency band of a notch filter adjustable of the attenuation frequency band, based on intensities of the integrated signals of each of the plurality of frequency bins,
wherein the setting of the attenuation frequency band includes calculating an estimation of error of the interference wave signal frequency based on the intensities of the integrated signals of each of the plurality of frequency bins, correcting the detected interference wave signal frequency by the estimation of error, and updating the attenuation frequency band of the notch filter based on the corrected detected interference wave signal frequency;
wherein the calculating of the integrated signals includes:
frequency-scanning output signals that are the reception signals outputted through the notch filter in a first frequency band, and outputting first integrated signals of each of a plurality of frequency bins in a first frequency bandwidth that have frequency bands non-overlapped with each other; and
frequency-scanning the reception signals in a second frequency band with a second frequency bandwidth narrower than the first frequency bandwidth and based on the attenuation frequency band, and outputting second integrated signals at each of a plurality of frequency bins in the second frequency bandwidth having frequency bands that partially overlap with each other, and
wherein the setting of the attenuation frequency band includes detecting the interference wave signal frequency based on the first integrated signals and calculating the estimation of error of the interference wave signal frequency based on the second integrated signals.

14. The interference wave signal removing program of claim 13, wherein the second frequency bandwidth of the second frequency band is narrower than the first frequency bandwidth of the first frequency band.

15. The interference wave signal removing method of claim 13, wherein the frequency-scanning of the reception signals in the second frequency band is performed for each of a plurality of notch filters connected in series, wherein the frequency-scanning of the reception signals for each notch filter in the second frequency band includes scanning the input signals of the notch filter target in the second frequency band for each notch filter, and calculating the second integrated signals for each frequency bin in the second frequency bandwidth, and wherein setting the attenuation frequency band includes calculating the estimation of error of the interference wave signal frequency for each frequency bin in the second frequency bandwidth and setting the attenuation frequency band for each notch filter, based on the second integrated signals for each frequency bin in the second frequency bandwidth.

* * * * *